United States Patent
Walton et al.

[11] Patent Number: 6,045,154
[45] Date of Patent: Apr. 4, 2000

[54] PASSENGER AIRBAG TETHERING DEVICE

[75] Inventors: David Noel Walton, Basildon; Marcus John Scott Ward, Billericay, both of United Kingdom

[73] Assignee: Ford Global Technologies, Inc., Dearborn, Mich.

[21] Appl. No.: 08/984,960

[22] Filed: Dec. 4, 1997

[30] Foreign Application Priority Data

Dec. 6, 1996 [GB] United Kingdom ............... 9625395

[51] Int. Cl.⁷ ............................................ B60R 21/16
[52] U.S. Cl. .............................. 280/728.3; 280/732
[58] Field of Search ....................... 280/728.2, 728.3, 280/731, 732, 743.2

[56] References Cited

U.S. PATENT DOCUMENTS

| | | | |
|---|---|---|---|
| 5,072,967 | 12/1991 | Batchelder et al. | 280/732 |
| 5,308,111 | 5/1994 | Sommer | 280/728.3 |
| 5,332,257 | 7/1994 | Rogers et al. | 280/728.3 |
| 5,374,078 | 12/1994 | Amamori et al. | 280/728.3 |
| 5,431,433 | 7/1995 | Steimke et al. | 280/728.3 |
| 5,456,488 | 10/1995 | Bauer | 280/728.1 |
| 5,460,401 | 10/1995 | Gans et al. | 280/728.3 |
| 5,474,324 | 12/1995 | Bentley et al. | 280/728.3 |
| 5,553,746 | 9/1996 | Jones | 222/129.1 |

FOREIGN PATENT DOCUMENTS

| | | | |
|---|---|---|---|
| 0 695 669 A1 | 2/1966 | European Pat. Off. | |
| 7-009933 | 1/1995 | Japan | |
| 7-047905 | 2/1995 | Japan | |
| 7-069161 | 3/1995 | Japan | |
| 7-144590 | 6/1995 | Japan | |
| 7-144594 | 6/1995 | Japan | |
| 7-164986 | 6/1995 | Japan | |

*Primary Examiner*—Paul N. Dickson
*Attorney, Agent, or Firm*—David B. Kelley

[57] ABSTRACT

A vehicle airbag assembly (1, 101) including an airbag door (3,103) arranged to be opened on airbag deployment, and which is tethered to a fixed anchor point (5,105) by a tether assembly (11,111), the tether assembly(11,111) comprising a substantially flexible strap member extending between the fixed anchor point (5,105) and the airbag door (3,103) such that its longitudinal axis (13,113) extends substantially perpendicular to an edge of the airbag door, each of the airbag door (3,103) and the anchor point (5,105) defining a mounting area to which an end of the tether is secured, the tether assembly (11,111) arranged such that a first one of the mounting areas (7,107) comprises an elongate unitary zone arranged along a single longitudinal axis(19,119), and the second one of the mounting areas (9,109) comprises at least two zones whose respective longitudinal axes are non-collinear whereby the tether assembly(11,111) absorbs energy as the airbag door is deployed and controls its movement.

4 Claims, 4 Drawing Sheets

PASSENGER AIRBAG TETHERING DEVICE

FIELD OF THE INVENTION

The invention relates to an airbag door tethering device for tethering a vehicle airbag door to a fixed anchor member and an improved airbag assembly including such tethering device. Typically the fixed anchor member comprises the airbag mechanism or part of the instrument panel of the vehicle.

BACKGROUND OF THE INVENTION

Many vehicles employ driver and passenger airbags as safety features of a vehicle vehicles. When an airbag is deployed a door defined in the airbag cover has to open to allow inflation of the airbag. Typically the door is formed by lines of weakness in the airbag cover, with the lines of weakness typically being arranged to create controlled movement of the door.

In one design of passenger airbag the cover includes a door which is arranged to be deployed by opening about one of its edges in a hinged arrangement before the hinged edge is torn from the rest of the cover. However problems may arise if the airbag door movement is not controlled.

It has therefore been proposed to provide a flexible tether extending between a fixed anchor point and the airbag door to prevent the airbag door from departing in an uncontrolled manner from the airbag cover. However the forces applied on the airbag door are very high and typically such tethers will eventually tear. However the tether can serve to absorb some of the energy of the door.

Tethers have been designed which attempt to control the movement of a door. One such example is described in U.S. Pat. No. 5,308,111. In this arrangement a single strap extends from one side of the airbag door across the airbag to the other edge of the airbag door thus serving as two tethers tethering opposite edges of the airbag door. The strap extending between the edge of the airbag door and fixed anchor points is folded several times where the folds are non-parallel to one another.

In the specification the term 'fixed anchor point' is intended to encompass any member within the vehicle which will remain substantially fixed during airbag deployment and which is strong enough to withstand the forces applied to the airbag door to allow the door to be tethered to it. Typically this will comprise a bracket on the airbag mechanism or part of the instrument panel.

SUMMARY OF THE INVENTION

According to a first aspect of the invention there is provided a vehicle airbag assembly including an airbag door arranged to be opened on airbag deployment, and which is tethered to a fixed anchor point by a tether assembly, the tether assembly comprising a substantially flexible strap member extending between the fixed anchor point and the airbag door such that its longitudinal axis extends substantially perpendicular to an edge of the airbag door, each of the airbag door and the anchor point defining a mounting area to which an end of the tether is secured, the tether assembly arranged such that a first one of the mounting areas comprises an elongate unitary zone arranged along a single longitudinal axis, and the second one of the mounting areas comprises at least two zones whose respective longitudinal axes are non-collinear whereby the tether assembly absorbs energy as the airbag door is deployed and controls its movement.

In use therefore the strap is substantially planar in the region adjacent the first mounting area (with the elongate unitary zone) but is non-planar in the region of the second mounting area.

Preferably the first mounting area is the mounting area on the fixed anchor member and the mounting area on the airbag door comprises the second mounting area.

The non collinear zones may be parallel and spaced one from another or may be at an angle to each other.

Typically the strap member is of webbing. However, the choice of other suitable materials will be apparent to the skilled addressee of the specification.

The method of attachment of the strap member to the mounting areas may be by a plurality of rivets, by adhesive or by other conventional mounting means dependant on the material of the strap. The choice of a suitable method will be apparent to the skilled addressee of the specification.

A single flat strap member would allow the airbag door to rotate in an uncontrolled manner about the connections of the tether to the door and the anchor member. By arranging the tether such that at one end it is non-planar, control of the trajectory of the airbag door can be arranged and tearing of the tether to provide absorption of energy is facilitated.

Preferably the strap member is formed from one flat piece of material which is then cut or folded to conform to the mounting areas. Typically the strap member includes at each end a set of attachment points which if the strap member were laid flat would be arranged along one axis.

In one embodiment the strap member is arranged such that it is folded in a direction generally parallel to its longitudinal axis in the region end to be mounted to the second mounting area so that the end will conform to the second mounting area, which comprises two zones whose longitudinal axes are at an angle to each other arranged in a V-shape configuration. Here the end of the strap is mounted to the second mounting area with the fold matched with the tip of the 'V'. The position and angle of the attachments to the door can be used to control the final angle of the door.

In an alternative embodiment the strap member is divided along part of its length to provide at least two part strap members to be attached to the second mounting area, the division not extending the entire length of the strap. The part straps are flexible and can readily conform to a non linear mounting area, with the other end being mounted on the first mounting area.

Preferably in this case the strap is split into three part straps, each part strap including at least one attachment point and the mounting area to which they are attached comprising three zones the longitudinal axes of the zones being parallel one to another. Preferably the two outer part straps are attached to zones having aligned longitudinal axes with the inner part strap member being attached to a non-aligned zone. Thus when affixed to the second mounting area the inner part strap will lie at an angle to the outer two part straps. By altering the position of the three attachment points to the door the final angle of the door can be controlled.

The second mounting area is typically on the airbag door, so that the affixing of the door and its tether to the fixed anchor point is conventional.

According to a second aspect of the invention there is provided an airbag cover for mounting on an airbag mechanism, in which the airbag cover defines a door openable on airbag deployment, and a tether assembly for attaching to a fixed anchor point, the tether assembly comprising a substantially flexible strap member extending from the airbag door such that its longitudinal axis extends substantially perpendicular to an edge of the airbag door, the tether assembly being secured to a mounting area on the airbag door which comprises at least two zones whose respective longitudinal axes are non-collinear so that the strap is nonplanar at its end mounted upon the door whereby the tether assembly absorbs energy as the airbag door is deployed and controls its movement.

BRIEF DESCRIPTION OF THE DRAWINGS

Two airbag assemblies in accordance with the invention will now be described, by way of example only, with reference to the accompanying drawings, in which.

DESCRIPTION OF THE PREFERRED EMBODIMENTS

Figure 1:
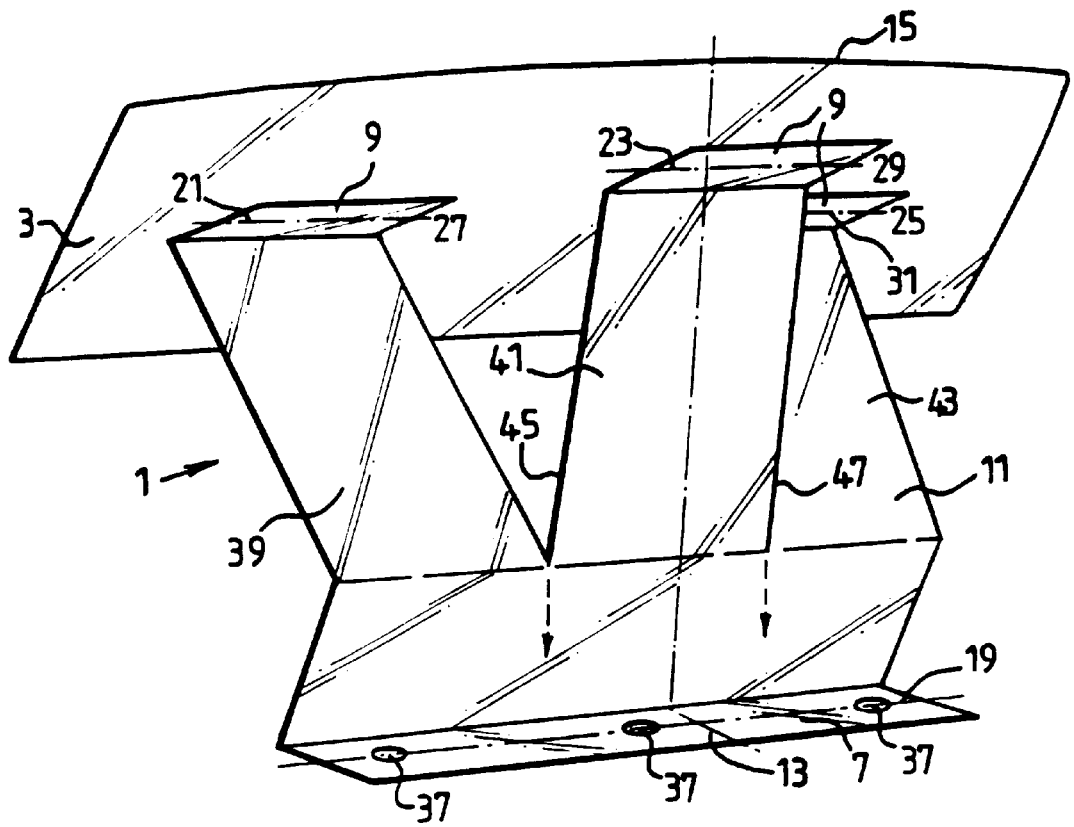
FIG. 1 is a schematic perspective view of a first tether assembly.
Figure 2:
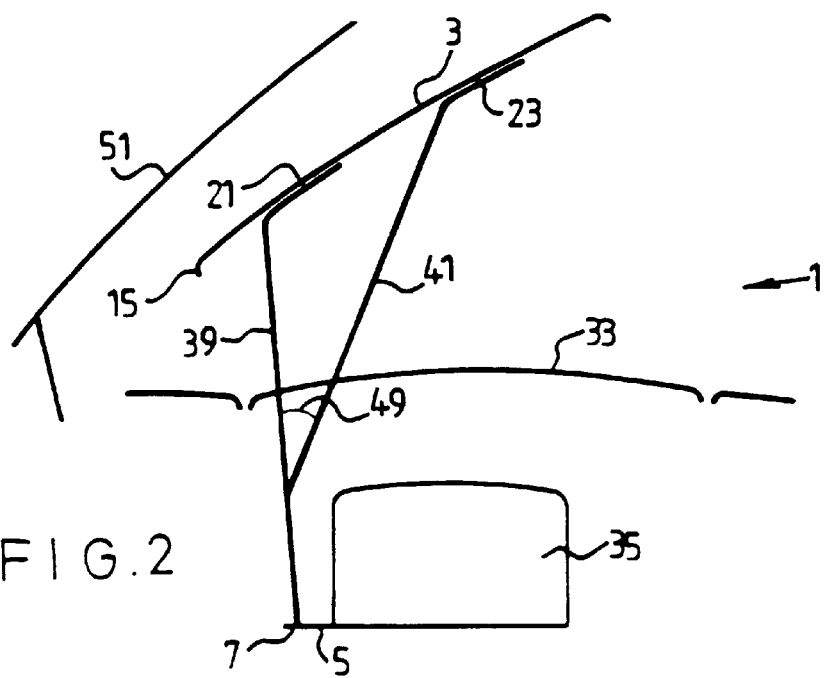
FIG. 2 is a schematic section through the tether assembly of FIG. 1.

FIGS. 1 and 2 illustrate a vehicle airbag assembly 1 including an airbag door 3 to be opened on airbag deployment and which is tethered to a fixed anchor point 5 by a tether assembly 11. The tether assembly 11 comp rises a substantially flexible strap member extending between the fixed anchor point 5 and the airbag door 3 such that its longitudinal axis 13 extends substantially perpendicular to the edge 15 of the airbag door 3.

Each of the anchor point and the airbag door define a mounting area 7,9 to which an end of the tether assembly 11 is secured A first one of the mounting areas 7 (in this case on the fixed anchor point) comprises an elongate unitary zone arranged along a single longitudinal axis 19.

A second one of the mounting areas 9 (in this case on the door 3)comprises at least two (here three) zones 21,23 and 25 whose respective longitudinal axes 27,29 and 31 are non collinear whereby the tether assembly 11 absorbs energy as the airbag door is deployed and controls its movement.

The at least rest (i.e. undeployed) position 33 of the airbag door 3 is shown in FIG. 2. The fixed anchor point 5 is here a bracket welded to the airbag mechanism(illustrated generally at 35). The airbag mechanism itself is conventional and many different designs could be chosen. The at rest position of the tether is in a folded condition. The tether is flexible and will fold along an axis substantially perpendicular to the longitudinal axis.13.

The mounting of the edge of the tether 11 to the first mounting area 7 on the anchor point 5 is by passing bolts or rivets (not shown) through holes 37 in the tether which is of webbing which is flexible and strong. The holes 37 act as attachment points which are collinear and lie substantially along the axis 19 which is substantially perpendicular to axis 13 of the strap 11.

In this region of the strap member 11, the webbing is substantially planar.

The strap is split into 3 part straps 39,41 and 43. The divisions 45 and 47 only extend along part of the straps length and are substantially parallel to the longitudinal axis 13 of the strap. The part straps are substantially of equal width.

The part straps allow the tether to conform to the second mounting area 9. Here the mounting area 9 comprises two outer zones 21 and 25 whose axes 27 and 31 are collinear, and an inner zone 23 whose axis 29 is parallel but spaced from the other axes 27 and 31. The part straps are affixed to the mounting zones by a suitable adhesive where the outer part straps 39 and 43 are mounted to the aligned outer zones 21 and 25, and the inner part strap 41 is mounted on the inner zone 23.

In this area it can be seen that the tether assembly is non planar, with the inner part strap 41 lying at an angle 49 to the outer part straps 39 and 45. It will be apparent that this will control the trajectory of the door 3 and prevent it from hitting the windscreen 51 of the vehicle.

The choice of suitable angle 49 will depend on the relative positions of the airbag door at rest position 33 relative to the windscreen 51.

Figure 3:
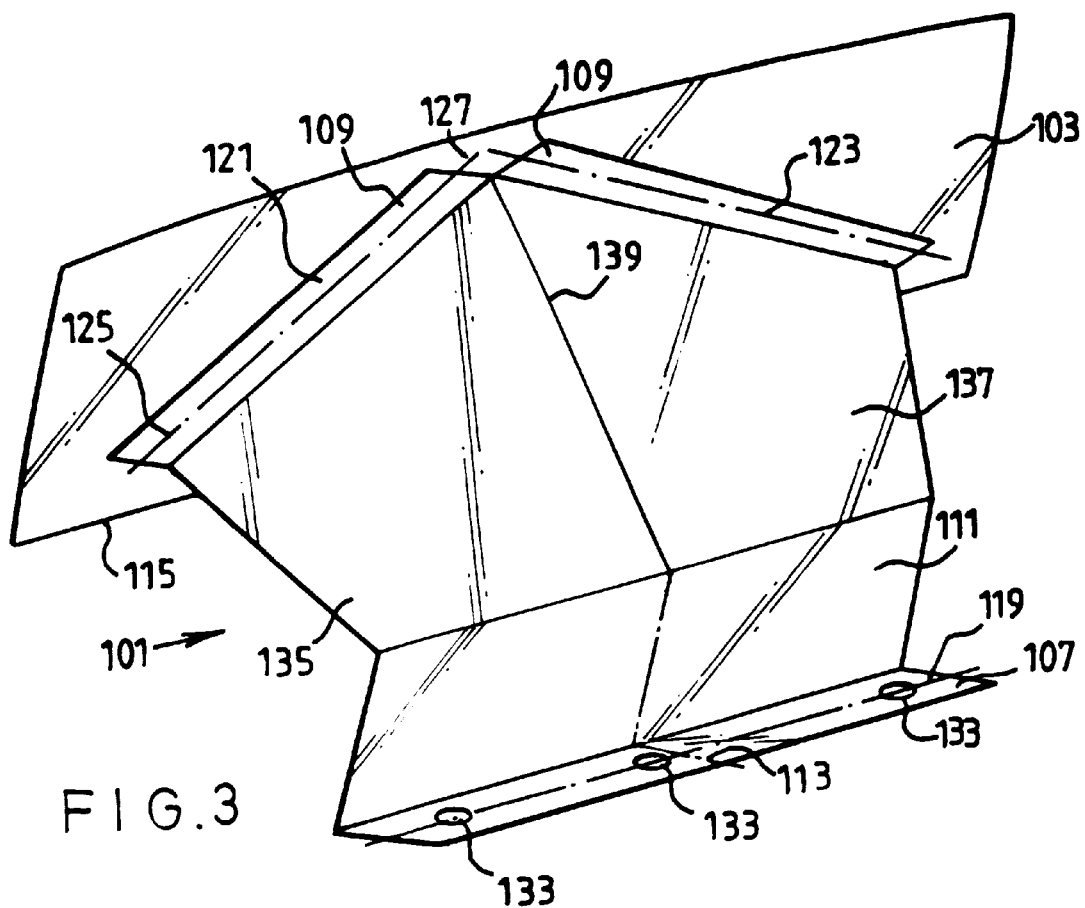
FIG. 3 is a schematic perspective view of a second tether assembly.
Figure 4:
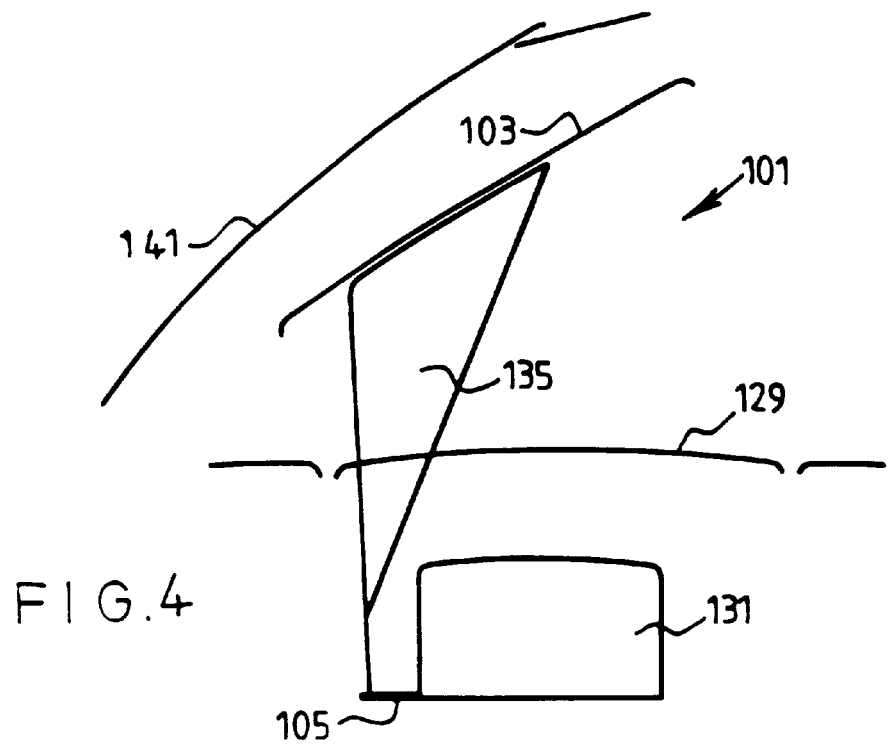
FIG. 4 is a schematic section through the assembly of FIG. 3.

The second airbag assembly 101 is illustrated in FIGS. 3 and 4. The assembly 101 includes an airbag door 103 to be opened on airbag deployment and which is tethered to a fixed anchor point 105 by a tether assembly 111. The tether assembly 111 comprises a substantially flexible strap member extending between the fixed anchor point 105 and the airbag door 103 such that its longitudinal axis 113 extends substantially perpendicular to the edge 115 of the airbag door 103.

Each of the anchor point and the airbag door define a mounting area 107,109 to which an end of the tether assembly 111 is secured.

A first one of the mounting areas 107 (in this case on the fixed anchor point) comprises an elongate unitary zone arranged along a single longitudinal axis 119.

A second one of the mounting areas 109 (in this case on the door 103)comprises two zones 121, and 123 whose respective longitudinal axes 125 and 127 are non collinear whereby the tether assembly 11 absorbs energy as the airbag door is deployed and controls its movement.

The at rest (i.e. undeployed) position 129 of the airbag door 103 is shown in FIG. 2. The fixed anchor point 105 is here a bracket welded to the airbag mechanism(illustrated generally at 131). The airbag mechanism itself is conventional and many different designs could be chosen. The at rest position of the tether is in a folded condition. The tether is flexible and will fold along an axis substantially perpendicular to the longitudinal axis.113.

The mounting of the edge of the tether 111 to the first mounting area 107 on the anchor point 105 is by passing bolts or rivets (not shown) through holes 133 in the tether which is of webbing which is flexible and strong. The holes 133 act as attachment points which are collinear and lie substantially along the axis 119 which is substantially perpendicular to axis 113 of the strap 111.

In this region of the strap member 111, the webbing is substantially planar.

Along part of its length the strap 111 is folded into two part straps 135 and 137. The fold 139 is substantially parallel to the longitudinal axis 113 and in fact lies on the axis 113. This fold 139 allows the strap to conform to the second mounting zone 109. One part strap 135 is secured to the zone 121, and the other part strap 137 is secured to the zone 123. The zones lie at an angle to one another in a V configuration and the fold 139 is coincident with the tip of the 'V'. The strap is attached to the door 103 by a suitable adhesive.

The use of the fold ensures that the tether 111 is non planar in the region of the airbag door 103 allowing control over the deployment of the door 103 to prevent it from hitting the adjacent windscreen 141.

The use of the tether assembly in accordance with the invention means that one single webbing tether can be used to control the trajectory of the deployed door.

Given that the mounting of the tether to the fixed anchor point is a conventional mounting with the tether being planar in this area, the airbag cover with its door attached to the tether assembly may be supplied as a separate item with assembly just requiring attachment of the tether to the anchor point.

Figure 5:
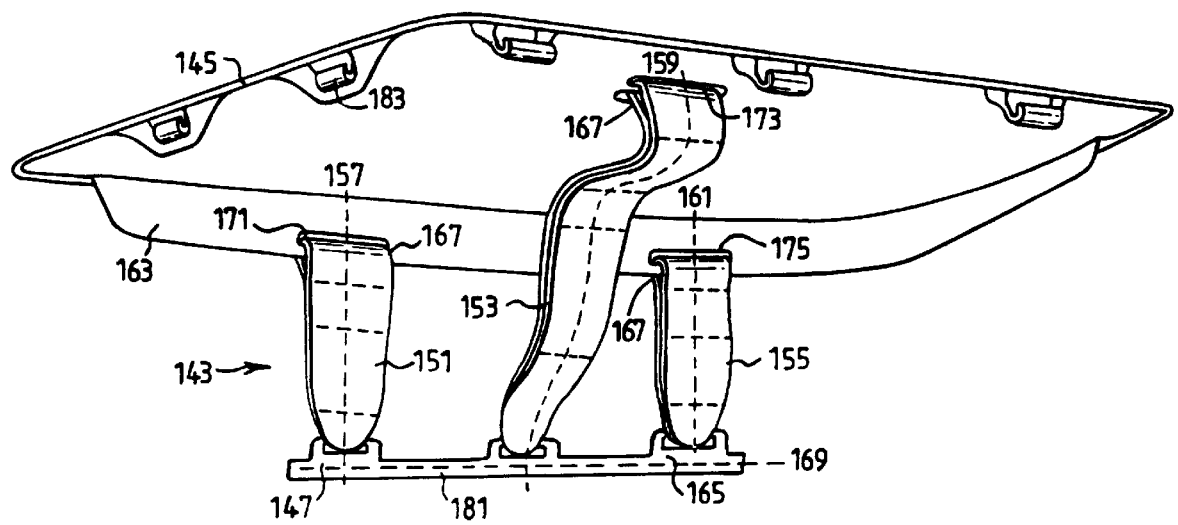
FIG. 5 is a schematic perspective view of a third tether assembly.
Figure 6:
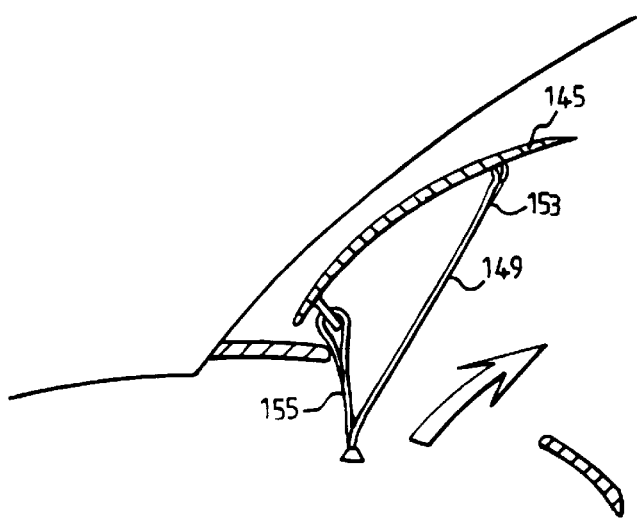
FIG. 6 is a schematic section through the assembly of FIG. 5.
Figure 7:
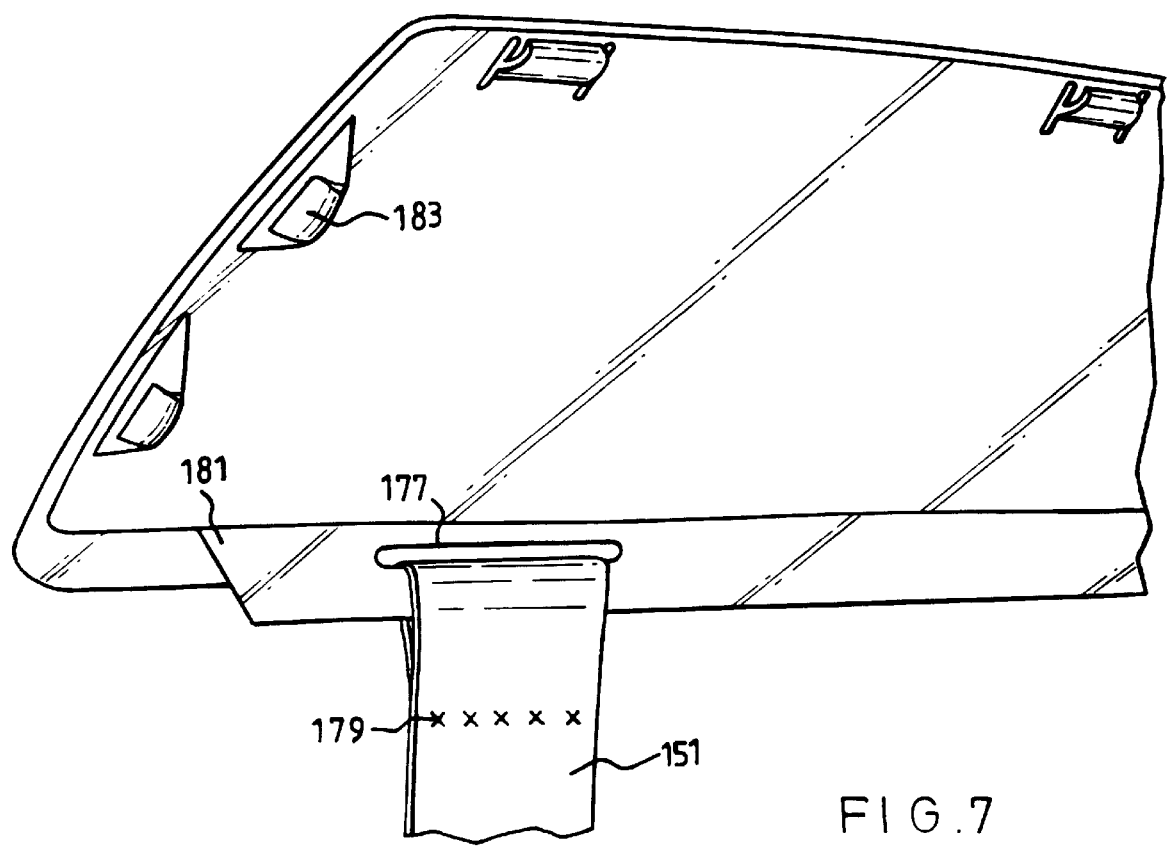
FIG. 7 is an enlarged part perspective view of the assembly of FIG. 5.

FIGS. 5 to 7 illustrate a third vehicle airbag assembly 143 including an airbag door 145 to be opened on airbag deployment and which is tethered to a fixed anchor point 147 by a tether assembly 149. The tether assembly 149 comprises three substantially flexible strap member 151, 153, and 155 extending between the fixed anchor point 147 and the airbag door 145.

Each of the anchor point and the airbag door define a mounting area 165,167 to which an end of the tether assembly 149 is secured.

A first one of the mounting areas 165 (in this case on the fixed anchor point) comprises an elongate unitary zone arranged along a single longitudinal axis 169.

A second one of the mounting areas 167 (in this case on the door 145) comprises at least two (here three) zones 171, 173, and 175 whose respective longitudinal axes are non collinear whereby the tether assembly 149 absorbs energy as the airbag door is deployed and controls its movement.

The mounting area 167 comprises two aligned, collinear mounting zones 171, 175 to which strap members 151 and 155 are respectively attached, and a third offset but parallel mounting zone 173 to which strap member 153 is attached.

The mounting of each end of the each strap member is the same but only one is illustrated and will be described in detail with reference to FIG. 7. A length of strap is passed through a slot 177 in the mounting area. The end of the strap is then stitched to the rest of the strap member by a line of stitching 179 which hold the strap member securely in position.

The mounting area on the anchor point is provided by bracket 181.

The airbag door 145 included auxiliary clips 183 around its periphery to secure it in position when undeployed. When deployed the clips are not strong enough to hold the door closed and the door is forced open as shown in FIG. 6. The tether assembly guides the movement of the door 145 to reduce or remove windshield contact.

What is claimed is:

1. A vehicle airbag assembly including an airbag door arranged to be opened on airbag deployment, and which is tethered to a fixed anchor point by a tether assembly, the tether assembly comprising a substantially flexible strap member formed from a single flat flexible sheet, the flexible strap member extending between the fixed anchor point and the airbag door such that a longitudinal axis defined by the length of the strap extends substantially perpendicular to an edge of the airbag door, each of the airbag door and the anchor point defining a mounting area to which an end of the tether is secured, the tether assembly arranged such that a first one of the mounting areas on the fixed anchor point comprises an elongate unitary zone arranged along a single longitudinal axis, and the second one of the mounting areas on the airbag door comprises at least two zones whose respective longitudinal axes are non-collinear whereby the tether assembly absorbs energy as the airbag door is deployed to control movement thereof and wherein the first mounting area is on the fixed anchor point and the second mounting area is on the airbag door and is comprised of two zones arranged in a V configuration, the strap member formed from a single flat flexible sheet including one fold affixed to a tip of the V configuration.

2. An airbag assembly according to claim 1, in which the tether includes two splits to split the strap along part of its length to form three part straps, and the second mounting area comprises three zones whose longitudinal axes are parallel and spaced one from another.

3. An airbag assembly according to claim 2, in which the second mounting area includes two outer zones having a common longitudinal axis and an inner zone having a parallel an spaced longitudinal axis, and the inner part strap is attached to the inner zone and the two outer straps are attached to the two outer zones.

4. An airbag assembly according to claim 3, in which the second mounting area includes two outer zones having a common longitudinal axis and an inner zone having a parallel spaced longitudinal axis, and the inner part strap is attached to the inner zone and the two outer straps are attached to the two outer zones.

* * * * *